United States Patent [19]
Ghaffari

[11] Patent Number: 6,105,075
[45] Date of Patent: Aug. 15, 2000

[54] SCATTER GATHER MEMORY SYSTEM FOR A HARDWARE ACCELERATED COMMAND INTERPRETER ENGINE

[75] Inventor: Bahareh Ghaffari, Denver, Colo.

[73] Assignee: Adaptec, Inc., Milpitas, Calif.

[21] Appl. No.: 09/083,569

[22] Filed: May 22, 1998

Related U.S. Application Data

[63] Continuation-in-part of application No. 08/906,369, Aug. 5, 1997, Pat. No. 5,931,920.

[51] Int. Cl.[7] .................................................. G06F 13/00
[52] U.S. Cl. .................................. 710/5; 710/22; 710/33
[58] Field of Search ............................ 710/5–6, 20–35; 709/209, 245

[56] References Cited

U.S. PATENT DOCUMENTS

| | | | |
|---|---|---|---|
| 4,797,812 | 1/1989 | Kihara | 710/26 |
| 5,239,640 | 8/1993 | Froemke et al. | 714/1 |
| 5,491,814 | 2/1996 | Yee et al. | 713/501 |
| 5,497,476 | 3/1996 | Oldfield et al. | 711/112 |
| 5,736,848 | 4/1998 | Vries et al. | 324/142 |
| 5,748,806 | 5/1998 | Gates | 710/126 |
| 5,761,861 | 6/1998 | Brackett | 52/218 |
| 5,784,390 | 7/1998 | Masiewicz et al. | 714/763 |
| 5,822,568 | 10/1998 | Swanstrom | 395/500.45 |
| 5,840,038 | 11/1998 | Xue et al. | 600/512 |
| 5,875,349 | 2/1999 | Cornaby et al. | 710/5 |
| 5,917,723 | 6/1999 | Binford | 364/131 |
| 5,931,920 | 8/1999 | Ghaffari et al. | 710/5 |
| 5,991,797 | 11/1999 | Futral et al. | 709/216 |
| 6,021,462 | 2/2000 | Minow et al. | 711/114 |

*Primary Examiner*—Christopher B. Shin
*Attorney, Agent, or Firm*—Duft, Graziano & Forest, P.C.

[57] ABSTRACT

A hardware accelerated memory system in a hardware accelerated I/O data processing engine that gathers and maintains pointers to a set of widely distributed source and/or destination data locations. The locations of the source and/or destination data locations operated on by the I/O data processing engine can include a memory local to the command interpreter and a memory remote from but accessible to the command interpreter by way of an I/O bus. Each source and/or destination scatter/gather list contains pointers to actual data locations that are either in a memory local to the command interpreter or a memory remote from the command interpreter but accessible by way of an interconnecting I/O bus. Each data location entry in a scatter/gather list is also accompanied by a byte count indicative of the total number of bytes at a given data location.

12 Claims, 13 Drawing Sheets

SCATTER GATHER MEMORY SYSTEM FOR A HARDWARE ACCELERATED COMMAND INTERPRETER ENGINE

RELATED APPLICATIONS

The present application is a Continuation-In-Part of U.S. patent application Ser. No. 08/906,369 filed Aug. 5, 1997, now U.S. Pat. No. 5,931,920, the text of which is incorporated herein by reference to the same extent as though the text were actually present.

SUMMARY OF THE INVENTION

The present invention relates to data processing engines, and more particularly to a scatter gather memory system for a hardware accelerated command interpreter engine that fetches and executes low level commands on designated data on behalf of at least one higher level hardware and/or software host or host device system.

PROBLEM

An Input/Output (I/O) controller is a system that manages the detailed operations required to move data from a source location to a destination location at the request of a local or remote computing device. A local computing device can include, but is not limited to, an internal host processor that controls an I/O bus that is used by the I/O controller. A remote computing device can include, but is not limited to, an external host processor that has access to a local computing device and/or an I/O bus that is used by the I/O controller. A source location and a destination location of data being moved by the I/O controller can both exist on the same I/O bus or on at least two separate I/O busses, and can be any combination of computing entity including, but not limited to, a local or remote computing device and local or remote data storage device.

One persistent problem with existing I/O controllers is that moving data to and from data storage devices by way of I/O busses is a relatively slow process compared to the processing speeds of even an average processor or Central Processing Unit (CPU) that manipulates the data. For this reason, there is an ongoing need for faster and more efficient techniques of moving data between computing devices and/or data storage devices.

One solution to optimizing the performance and efficiency of data processing engines generally, and I/O controllers specifically, is the improved command interpreter system as disclosed in the document or documents cited in the above identified section titled "Related Applications." The improved command interpreter system is a hardware accelerated data processing engine, also known generally as a sequencer, that queues and executes low level commands that when chained together perform larger complete tasks such as the writing of data to a magnetic disk storage device. However, a data processing engine can only execute discrete commands quickly and efficiently if the commands and their accompanying data are readily available for executing and error recovery. For this reason, there exists a long felt need for a fast and efficient system of gathering and organizing the data that are the target of data manipulations in the context of an autonomous hardware accelerated data processing engine. A solution to this problem as disclosed in this document has heretofore not been known.

SOLUTION

The above identified problems are solved by the scatter gather memory system of the present invention for use in a hardware accelerated Command Interpreter (CI) engine. The scatter gather memory system is an integral component of an autonomous hardware accelerated CI type data processing engine that executes a programmable set of data processing commands in response to a stimulus from a host processor in a host device. The CI itself includes registers and supporting hardware implemented logic blocks that include a command queuing system, a logic unit, a multi-purpose interface, at least one local memory, and a controlling state machine, that each operate in concert without direct software control. A host device that requests the completion of specific commands by the CI can be a software controlled processor environment. However, an exhaustive list of the types and purpose of specific commands a host device might deliver to the CI for execution are beyond the scope of the present disclosure but are not limited in any way by the present disclosure. One purpose of the scatter gather memory system in the CI is to coordinate the availability of data for use by the CI during data processing operations.

The scatter gather memory system is a configuration of registers and logic blocks that interact with a host device and other components within the CI itself. The stimulus that starts CI data processing activities is the writing of a command block address into a special register in the command interpreter. The contents of a command block can include, but is not limited to, a command code that identifies a type of operation to perform, at least one pointer to a list of data locations, and at least one counter representing the number of scatter/gather lists that are pointed to by the command block. The data locations for a data source are in a data structure known as a source scatter/gather list, and the locations for a data destination are in a data structure known as a destination scatter/gather list. Each source or destination scatter/gather list contain pointers to actual data locations that are either in a memory local to the command interpreter or a memory remote from the command interpreter but accessible by way of an interconnecting I/O bus. Each data location entry in a scatter/gather list is accompanied by a byte count of the number of bytes at a given data location. The data location lists are called scatter/gather lists because the data being operated on can be gathered from and scattered to various memory locations across a computing system.

DETAILED DESCRIPTION

Figure 1:
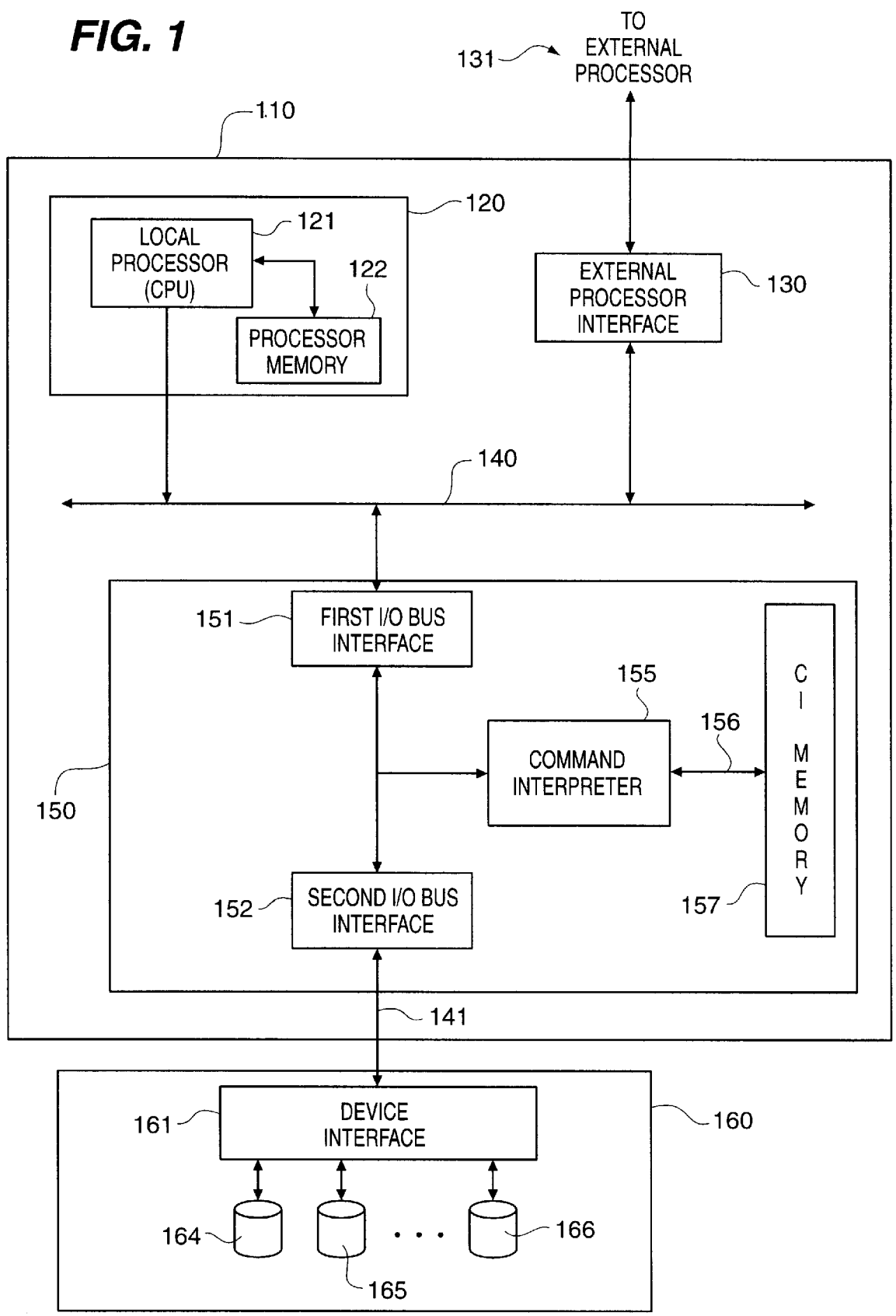
FIG. 1 illustrates a system level block diagram view of a computing system with an I/O controller and CI processing engine.
Figure 2:
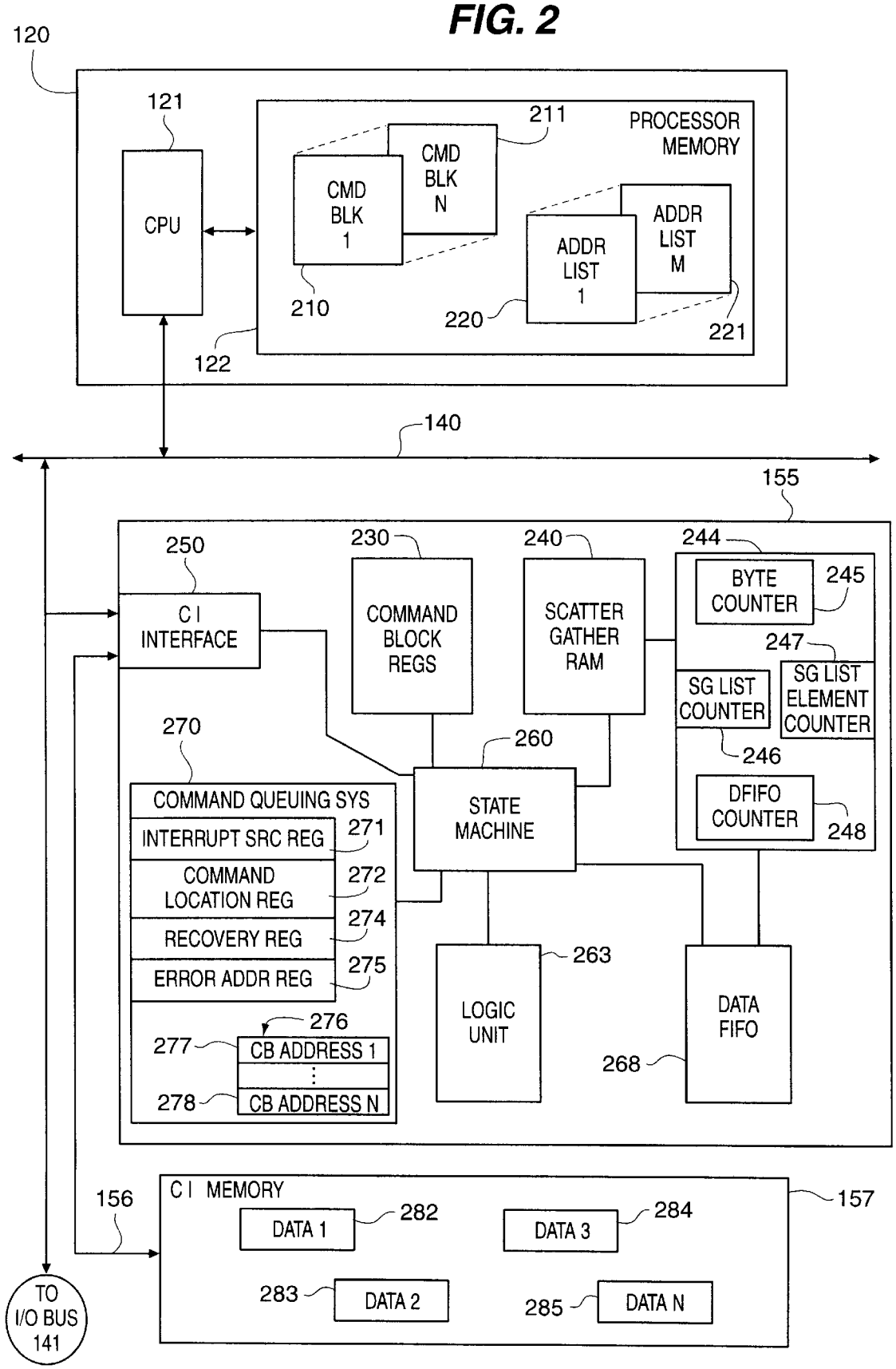
FIG. 2 illustrates details of the CI components and local processor in block diagram.

Architectural Overview FIGS. 1–2

FIG. 1 illustrates a system level view of a computing system 100 in the context of a RAID system. Using a RAID system as the basis for the present illustration is for example purposes only and is not intended as a limitation on the applicability of the present invention to other uses and/or inclusion in other computing system configurations. For example, the I/O controller 150 that includes the CI 155 of the present invention can be implemented in many different contexts including, but not limited to, a device controller context as in the present RAID system example, an I/O bridge context between two I/O busses, a basic I/O controller context having access to only one I/O bus, or any other I/O bus configuration.

The primary components of computing system 100 include, but are not limited to, a computing device 110 and a storage device 160. Components of storage device 160 include, but are not limited to, a magnetic disk device interface 161 also known in the context of the present example as a RAID interface, and a disk array comprised of multiple magnetic disk devices 164–166.

Components of computing device 110 include, but are not limited to, a local processor complex 120, an external processor interface 130, a first and second I/O bus 140 and 141 respectively, and an I/O controller 150. Components of local processor complex 120 are operatively connected to the first I/O bus 140 and include, but are not limited to, a local host processor memory 122, and a local processor 121 also known as a CPU, software controlled host or host device. External processor interface 130 is operatively connected to the first I/O bus 140 and an external processor 131 in a manner that supports communication connectivity between the external host processor 131 and the first I/O bus 140. Components of I/O controller 150 include, but are not limited to, a first I/O bus interface 151 to first I/O bus 140, a second I/O bus interface 152 to second I/O bus 141, and a CI 155 between the first and second I/O bus interfaces 151 and 152 respectively. CI 155 is operatively connected to a memory 157 by way of memory bus 156 for use as a cache during data manipulations and/or data transfer operations. Details of CI 155 components are disclosed in the text accompanying FIG. 2. The memory 157, also known as a cache, CI memory, or I/O controller memory, is typically a volatile memory such as any of a variety of Random Access Memory (RAM) types including, but not limited to, a Dynamic RAM (DRAM) or preferably a Synchronous DRAM (SDRAM) that are both well known and widely available commercially in the industry.

FIG. 2 illustrates the component details of the CI 155, local processor complex 120, and I/O controller memory 157, in block diagram form. Local processor complex 120 includes the components as stated in the text accompanying FIG. 1. The processor memory 122 of the local processor complex 120 is illustrated with contents including a set of n Command Blocks 210–211 and m scatter/gather address lists 220–221, the fields of which are disclosed in the text accompanying FIGS. 5–6 respectively.

The CI 155 is a programmable, hardware accelerated, non-processor driven data processing engine having state machine control comprised primarily of memory and registers interconnected by gated logic blocks. Because the CI 155 does not include software control intelligence, the CI 155 is driven by gated signals in response to commands and/or specified register bits that are supplied by a source external to the CI 155. The external source of commands that drive the CI 155 can include, but is not limited to, the local processor complex 120 or any other source accessible to the CI 155 by way of I/O busses 140 and/or 141. Timing for the CI 155 is obtained from any one of two sources depending on the operation taking place. Interactions with the I/O bus 140 use the bus clock frequency. Interactions with the I/O controller memory 157 use the memory□s clock frequency. Appropriate clock synchronization is made in any manner well known in the art to facilitate continuity of activities within the CI 155 that cross clock boundaries. The following discussion includes a disclosure of the fundamental CI 155 components in block diagram form. Details of the operational interactions among the scatter gather memory system and other fundamental CI 155 components are disclosed in the text accompanying FIGS. 3–14.

The fundamental CI 155 logic block components include, but are not limited to, the CI Interface 250, Command Block Registers 230, Scatter/Gather (SG) Random Access Memory (RAM) 240, State Machine 260, Command Queuing System 270, Logic Unit 263, and a Data First-In-First-Out (DFIFO) 268. State Machine 260 is the main control logic block for interactions and/or data transfers among the CI 155 components listed above, in addition to controlling interactions and/or data transfers between any CI 155 component and an external computing device and/or data storage device that is accessible to CI 155 by way of I/O busses 140 and 141. State Machine 260 control is accomplished in part by implementing the operational logic disclosed in the text accompanying FIGS. 3–14.

CI Interface 250 includes interfaces specific to any external I/O bus and the CI I/O controller memory 157 in addition to a general front end or internal interface for the CI 155 components. The portion of CI Interface 250 that acts as an interface to an external I/O bus includes the logic necessary to communicate with the I/O bus to which it is connected in that it can operate at the I/O bus clock frequency and pre-fetch bus addresses to maintain a zero wait state for Direct Memory Access (DMA) operations. The portion of CI Interface 250 that acts as an interface to the I/O controller memory 157 includes the logic necessary to communicate with the memory to which it is connected in that it can operate at the memory clock frequency and address and track the location of data written to and read from the I/O controller memory 157. The portion of CI Interface 250 that acts as an interface to the internal CI 155 components includes the logic necessary to communicate with either the external I/O bus interface or the memory interface regardless of the potential differences in clock frequencies.

Command Block Registers 230 include at least one register to store the contents of specific fields of a Command Block. Details of a Command Block are disclosed in the text accompanying FIG. 5. Command Block Registers 230 also include a command decoder to determine the operation to perform for a given command.

Scatter/Gather (SG) RAM 240 is an internal or external storage area for CI 155 that holds lists of source locations and destination locations of data being operated on by the CI 155. The preferred SG RAM 240 is an internal RAM storage for reasons of improved performance and rapid accessibility of data therein. The lists of source and/or destination data locations are pointed to by Scatter/Gather Lists (SG Lists), the details of which are disclosed in the text accompanying FIG. 6. SG RAM 240 is also accompanied by a Tracking Counter 244 that contains the logic and registers necessary to keep track of the present element of a source and/or destination SG List, the present byte count and byte location of data pointed by a given source and/or destination SG list element, and the total byte count and present number of bytes transferred for a given SG List element. Specific components of the Tracking Counter 244 that are used to keep track of source and destination data can be included in the SG RAM 240 itself or as separate operative registers and logic that operate in conjunction with the Command Block Registers 230, Data FIFO 268, and the State Machine 260. Regardless of specific location, the components of a Tracking Counter 244 include, but are not limited to, a Byte Counter 245, an SG List Counter 246, an SG List Element Counter 247, and a DFIFO Counter 248. The Byte Counter 245 counts the total number of bytes of data that have been transferred from a given element of a given SG List. The SG List Counter 246 points to the present source or destination SG List. The SG List Element Counter 247 points to the present element of a given source or destination SG List. The DFIFO Counter 248 counts the number of bytes transferred to or from DFIFO 268. The combination of the SG List Counter 246 and the SG List Element Counter 247 are used to address and/or index into the SG RAM 240 during operation of the scatter gather memory system of the present invention.

Command Queuing System 270 includes the logic and registers that are necessary to maintain at least one Command Queue Register 277–278 in a Command Queue 276. The preferred command queuing scheme is First-in-First-out, however, any other queuing scheme can be used. The Command Queue Registers 277–278 contain the location of individual Control Blocks that exist in locations external to CI 155. Control Registers 271–275 are used to control CI 155 and/or pass information between the local processor 121 and CI 155. Relevant Control Registers include, but are not limited to, Interrupt Source register 271, Command Location register 272, Recovery Register 274, and Error Address register 275. Additional details of the Command Queuing System 270 are disclosed in the text accompanying FIGS. 9–14.

Logic Unit 263 includes the logic and registers necessary to perform logical operations on data. The logical operation being performed on the data is controlled and/or coordinated by State Machine 260.

DFIFO 268 includes the logic and/or registers necessary to sequentially store and retrieve data being input and output during specific data manipulation operations and as data is being stored and retrieved from the larger I/O controller memory 157. Preferably, DFIFO 268 is a minimum size interleaved RAM that is at or about 512 k bytes.

Figure 3:
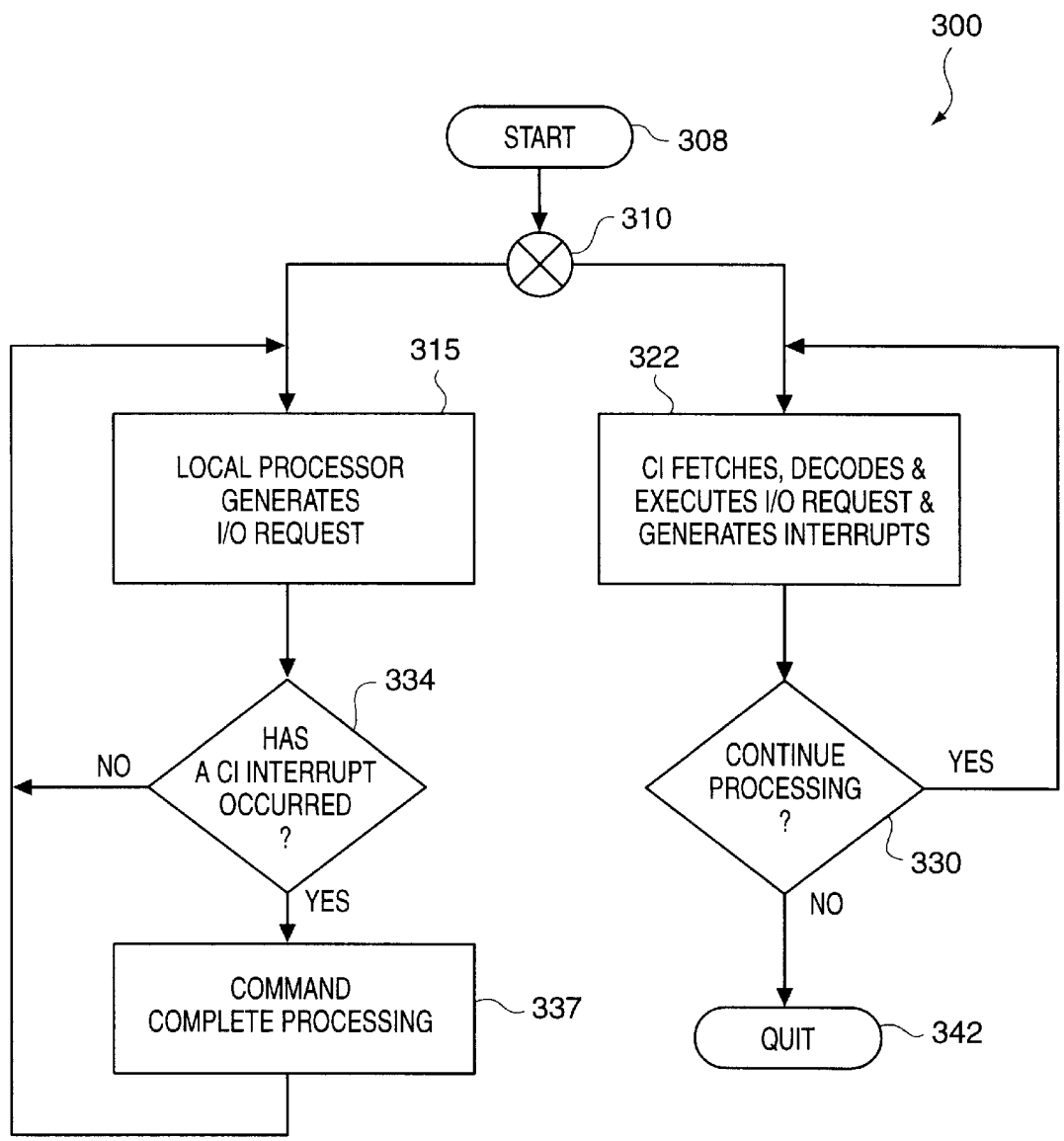
FIG. 3 illustrates the operational steps in flow diagram form for the improved CI system of the present invention.

CI Operational Overview FIG. 3

FIG. 3 illustrates an overview of the operational steps 300 in flow diagram form for the CI 155 acting concurrently and in concert with the software controlled local processor 121. The operational steps 300 begin at step 308 and proceed to branch point 310 where CI 155 and local processor 121 act in concert and typically concurrently since they are both independently functioning components.

The sequence of steps beginning with step 315 are performed by the local processor 121. At step 315, an I/O request is generated by the local processor 121 on behalf of a requesting entity such as the local processor 121 itself or an external processor 131. An I/O request for purposes of the present discussion is a request to manipulate data, or read data or write data from a source location to a destination location. Both the source location and the destination location must be accessible by way of at least one common I/O bus. For example in the context of FIG. 1, the source and destination locations of data can both be on I/O bus 140. Similarly, the source and destination locations of data can be on separate I/O busses 140 and 141 respectively where both busses 140 and 141 are accessible by way of an I/O bus bridge provided by I/O controller 150. Details of the I/O request generating steps are disclosed in the text accompanying FIGS. 4–6. Local processor 121 continues the activities disclosed in step 315 until such time as an interrupt occurs from the CI 155 as disclosed in the text accompanying step 334.

If it is determined at decision step 334 that the CI 155 has generated an interrupt to signal the completion of a presently executing command, then processing continues at step 337. At step 337 the local processor 121 determines the successful or unsuccessful completion of the most recently completed command or chain of commands in response to the CI interrupt received by the local processor 121 in step 334. When command completion processing is finished at step 337, processing continues at step 315 as previously disclosed. Alternatively, if it is determined at decision step 334 that no interrupt from the CI 155 exists, then local processor 121 continues at operational step 315 as previously disclosed.

The sequence of operational steps beginning with step 322 are performed by the CI 155. At step 322, the CI 155 portion of the I/O controller 150 fetches, decodes, and executes the specific tasks required to complete the I/O request previously generated at step 315. Details of the steps associated with fetching, decoding, and executing an I/O request and the data operated on by the I/O request by the CI 155, are disclosed in the text accompanying FIGS. 7–14. If at any time it is determined at decision step 330 by the CI 155 that I/O request processing should continue, then processing continues at step 322 as previously disclosed. Alternatively, if it is determined at decision step 330 by the CI 155 that I/O request processing should not continue, then processing stops at step 342.

Figure 4:
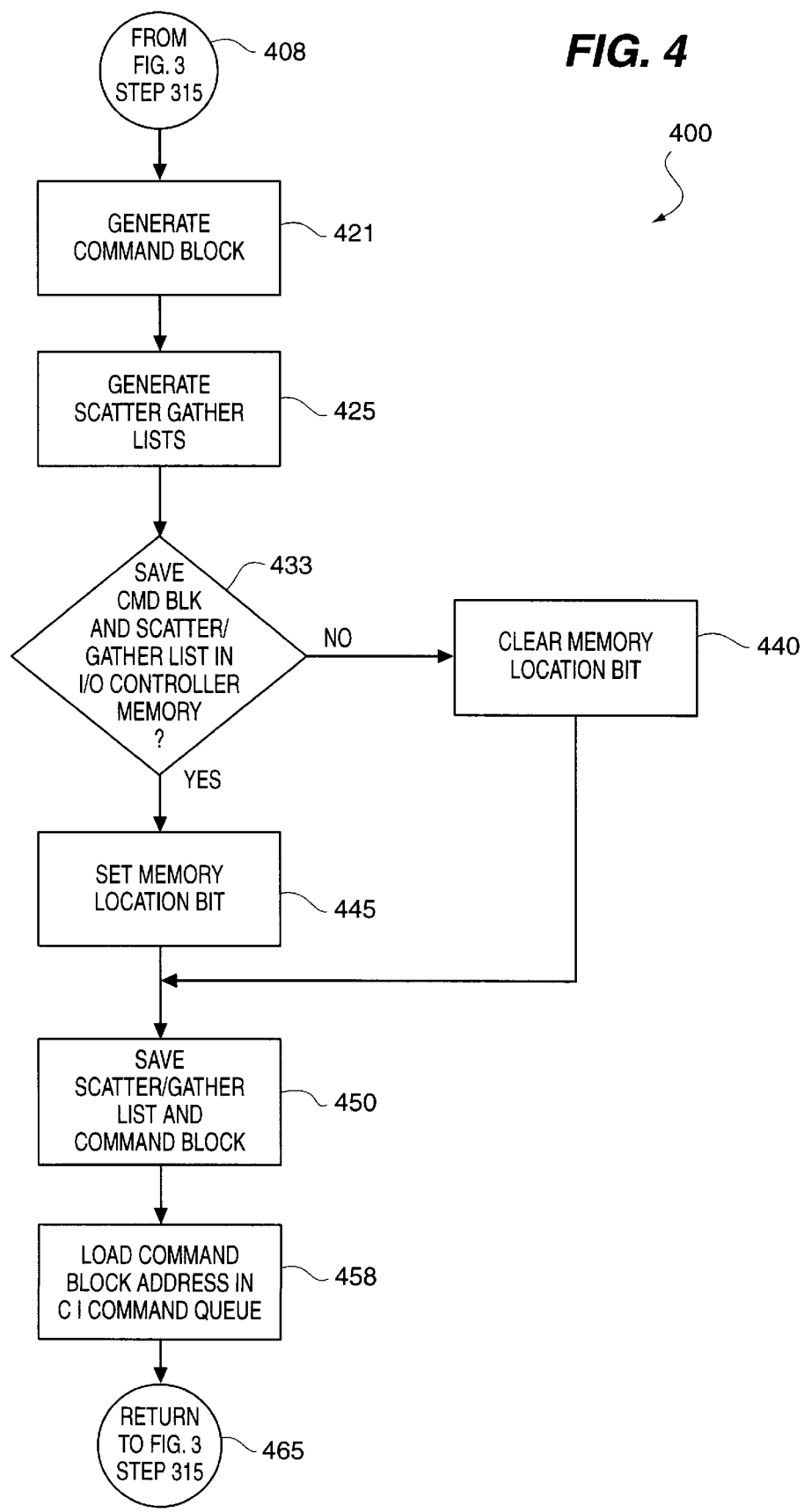
FIG. 4 illustrates the operational steps in flow diagram form for generating an I/O request for execution by the CI.
Figure 5:
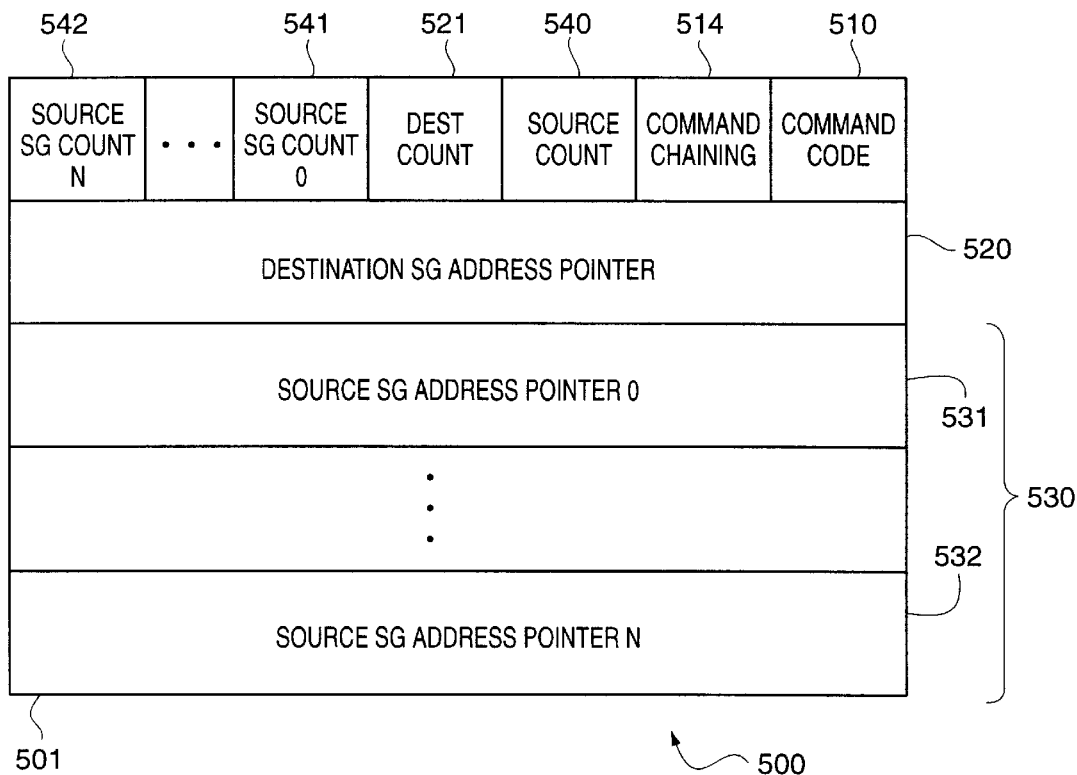
FIG. 5 illustrates a detailed field layout example of a command block.
Figure 6:
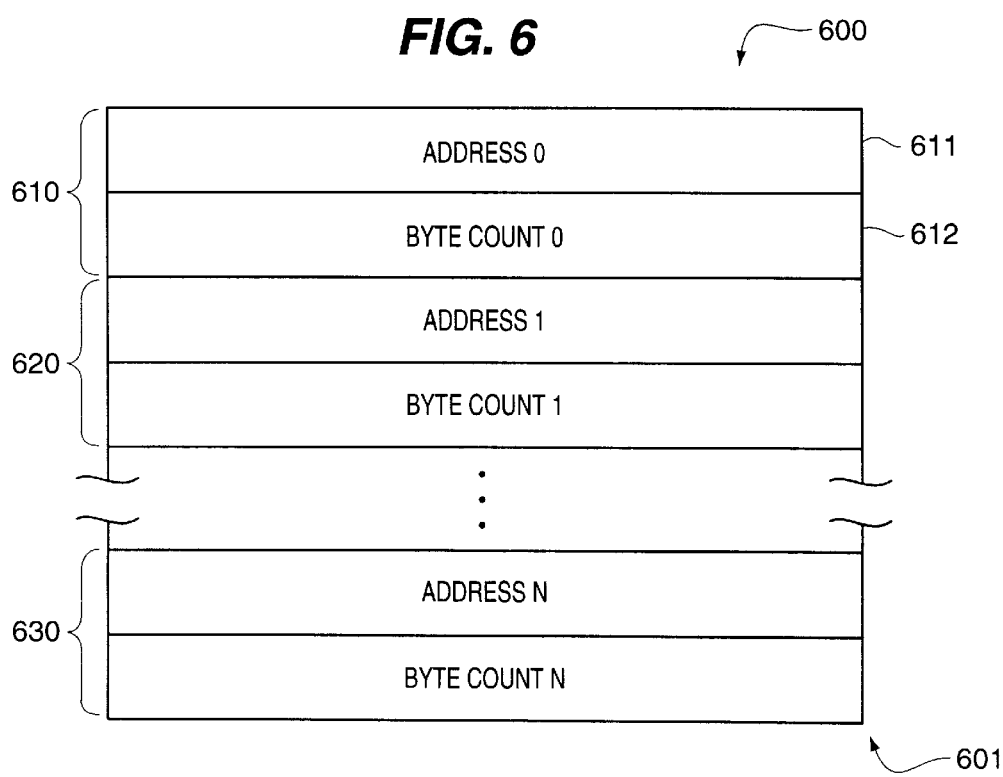
FIG. 6 illustrates a detailed example of fields in a scatter/gather list.

Generating An I/O Request—FIGS. 4–6

FIG. 4 illustrates the operational steps 400 in flow diagram form for generating an I/O request for execution by the CI 155. The operational steps 400 begin at step 408 and are the details of step 315 in FIG. 3. The operational steps 400 are performed by the local processor 121 on behalf of itself or in cooperation with an external processor 131. At step 421, the local processor 121 generates a Command Block on behalf of the entity responsible for a given I/O request. A Command Block contains information necessary for the CI 155 to execute the request. The contents of a Command Block can include, but are not limited to, the specific I/O command to execute and pointers to the relevant source and/or destination data locations. Details of the fields in an example Command Block are disclosed in the text accompanying FIG. 5.

A SG List corresponding to the Command Block of step 421, is generated at step 425 by either the local processor or an external processor. A SG List contains pointers to the source and/or destination locations of data being operated on by the I/O operation identified in the corresponding Command Block. Details of the fields in an example SG List are disclosed in the text accompanying FIG. 6.

Depending on the memory location where the entity requesting the I/O operation intends to store the Command Block and corresponding SG Lists generated in steps 421 and 425, the CI 155 must know how to interpret the location address being provided by the requesting entity. Any means of communicating this location information is considered within the scope of the present invention. One way to communicate the location information is to use a bit in a register that indicates whether the Command Block and SG Lists are in a memory local to the CI 155 or not. For example, if it is determined at decision step 433 that the Command Block and SG List of steps 421 and 425 are being saved in I/O controller memory local to the CI 155, then the Memory Location bit in the Command Location register 272 is set at step 445 to communicate the location information to the CI 155. Alternatively, if it is determined at decision step 433 that the Command Block and SG List of steps 421 and 425 are being saved in non-I/O controller memory external to the CI 155, then the Memory Location bit in the Command Location register 272 is cleared to communicate the location information to the CI 155. At step 450, the Command Block and accompanying SG List or lists are saved in a memory location as specified by the Memory Location bit.

At step 458, the local processor that generated the Command Block loads the Command Block address directly into the Command Queue 276. Loading a Command Block address in the Command Queue 276 signals the CI 155 to begin processing an I/O request if processing is not already in progress. The I/O requests are typically processed in a FIFO manner. The operational steps 400 for generating an I/O request are complete at step 465 and processing returns to step 315 of FIG. 3.

FIG. 5 illustrates a Command Block field layout example 500 for a Command Block 501. The purpose of a Command Block is to identify the command to be executed and the data on which the command will operate. Key fields in the Command Block 501, for example, include the command to be executed as identified in the command code 510, the data destination is identified by the destination SG address pointer field 520, and the data source is identified by the source SG address pointer fields 530 comprised of n fields 531–532. Note that the size of a Command Block, the specific fields, field locations, and field sizes illustrated in the example Command Block 501 are for example purposes only and other configurations and sizes are considered within the scope of the present invention. The Command Block 501 can be a fixed number of fields or variable number of fields depending on the total number of SG address pointers 520 and 530.

The Command Code field 510 contains a unique code for each of a predetermined set of commands. The types of commands can include, but are not limited to, Initialize, Copy, Direct Memory Access (DMA) Read, DMA Write, XOR, Verify, Compare, and Error Correction Code (ECC) Check. Examples of a variety of I/O commands and the operation of each command with respect to the scatter gather memory system of the present invention, are disclosed in the text accompanying FIGS. 9–14.

The destination SG address pointer 520 is an address that identifies the location of a destination SG List. The destination SG List contains the address and byte count of data locations where the results of a given data operation should be placed. The destination SG address pointer 520 is accompanied by a Destination Count field 521 that identifies the number of destination addresses and byte counts that exist in the destination SG List. The number of destination addresses and byte counts are known generically as elements of a SG List. One embodiment of the present invention is to include one destination SG address pointer to a single SG List because the destination location of data is typically a preallocated single or tightly clustered memory location. However, multiple SG Lists each having multiple elements therein can be included in a Command Block if desired, and the implementation of multiple SG Lists would be similar to the multiple source SG Lists as disclosed below.

The source SG address pointers 530 are addresses that identify the location of respective source SG Lists. The number of source SG Lists in the Command Block 501 are identified in the Source Count field 540. Each source SG List contains an address and byte count of source data being used as input to a given data operation carried on by the CI 155. Each data source pointer 531–532 is accompanied by a Source SG Count field 541–542 that identifies the number of elements in each source SG List.

The Command Chaining field 514 is a single bit used to indicate that the present command can be chained with at least one subsequent command thereby reducing the number of command complete interrupts generated by the CI 155. Typically, when the CI 155 completes a given data operation, an interrupt is generated to notify the local processor 121 that a given data operation has completed successfully. If the bit in the Command Chaining field 514 is set for the data operation identified in the present Command Block 501, then an interrupt is generated when the operation is complete. However, if the bit in the Command Chaining field 514 is clear, then no command complete interrupt is generated and the CI 155 proceeds to the next data operation. Two ways command chaining can be useful are to tell the CI 155 that at least one additional command is available for execution on the Command Queue 276, and to reduce the number of command complete interrupts generated by the CI 155. The number of source and/or destination SG List pointers and related count fields in a Command Block 501 is determined by the requirements of a given implementation, the amount of SG RAM 240 space available, and the supporting pinout requirements of the associated logic and/or registers for the CI 155 generally.

FIG. 6 illustrates a detailed example of SG List fields 600 in a SG List 601 regardless of whether the list is for source data or destination data for any given operation. The purpose of a SG List 601 is to identify the quantity and location of data for a given data operation. In the example SG List 601, there are n elements 610–630. Each element includes, but is not limited to, key fields such as a data address 611 and a byte count 612. The byte count field 612 represents the number of bytes of data at the location of the address 611. A zero value in a byte count field indicates an unused element in the SG List.

No distinction is made between a destination SG List and a source SG List without knowing which field in Command Block 501 points to which SG List 601. However, only destination addresses are included in a destination SG List and only source addresses are included in a source SG List. Note that the size of any SG List and the specific fields therein, and the field locations and field sizes in the example SG List 601 are for example purposes only. The number of elements in the destination SG List is a function of the CI 155 word size and/or the number of bits allocated for a count field. Word size and/or count field size can limit the magnitude of the numbers that can be represented to numbers such as 16, 32, 64 or 128 for example. Other configurations and sizes are possible and are considered within the scope of the present invention.

Figure 7:
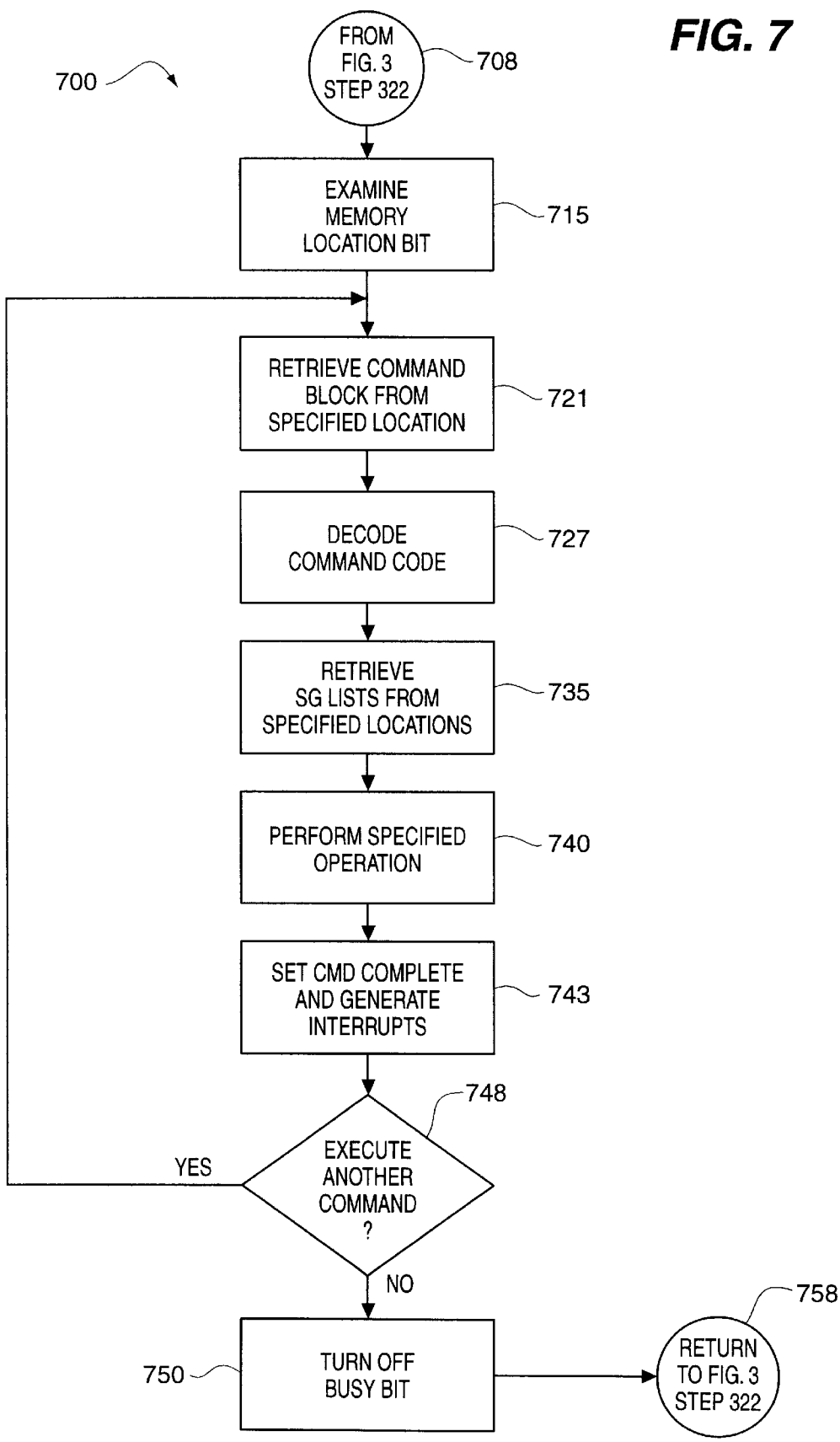
FIG. 7 illustrates an overview of the operational steps taken by the CI to retrieve a command block and execute an I/O request.
Figure 8:
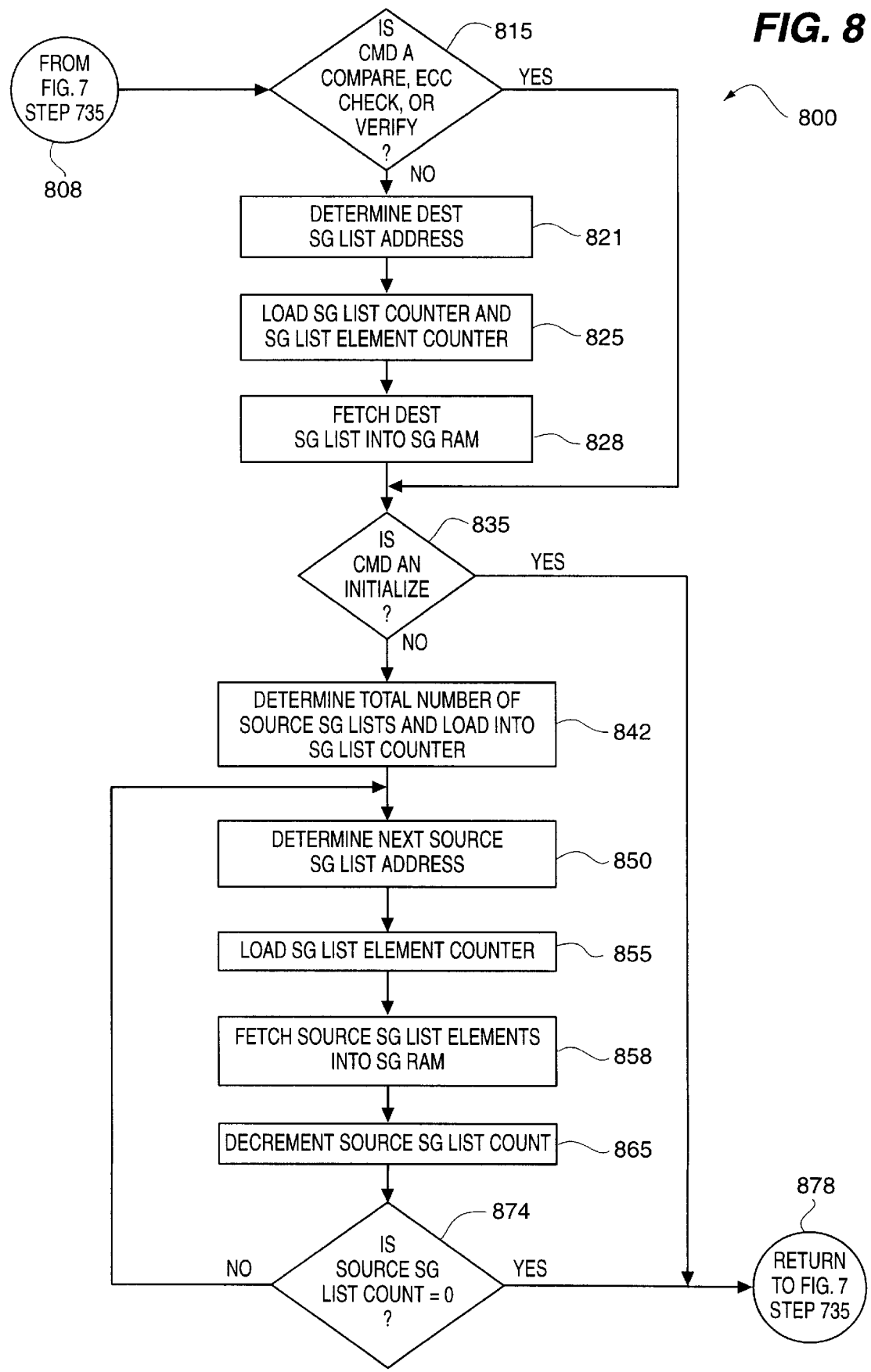
FIG. 8 illustrates the operational steps for locating and loading a source and/or destination scatter/gather list into a scatter gather random access memory local to the CI.

Fetch and Execute Steps—FIGS. 7–8

FIGS. 7–8 illustrate the details of the CI 155 operational steps that are taken to set up an I/O request for execution.

Specifically, FIG. 7 illustrates an overview of the operational steps 700 taken by the CI 155 to set up and execute an I/O request in response to the local processor 121 placing the address of a Command Block 501 into the Command Queue 276. The operational steps 700 begin at step 708 and are the details of step 322 in FIG. 3.

At step 715, the CI 155 examines the Memory Location bit in the Command Location register 272 to determine whether the Command Block 501 and corresponding SG Lists 601 are located in a memory local to the CI 155 or in a memory external to the CI 155. The location determination is made in view of the Memory Location bit being set or cleared.

At step 721, the CI 155 retrieves an address of a Command Block 501 from the Command Queue 276 and moves the Command Block contents from the specified address to the Command Block Registers 230 within the CI 155. The addresses 277–278 in Command Queue 276 are preferably retrieved in FIFO order.

At step 727, the command code 510 of Command Block 501 is decoded to identify the specific operation that is the subject of the present I/O request task that the CI 155 is to execute. Each one of a plurality of commands is identified by a unique combination of a plurality of bits that comprise the command code 510 field. The number of commands that can be represented by the command code 510 field is limited by the number of unique combinations that can be represented by the plurality of bits that comprise the command code 510 field.

At step 735, the address of each source and/or destination SG List 601 is retrieved in turn from the Command Block Registers 230 as the corresponding SG Lists themselves are moved from the specified address locations to the SG RAM 240. Details of retrieving a SG List 601 is disclosed in the text accompanying FIG. 8.

At step 740, a specific task is performed that is the substance of the command identified in step 727. Depending on which command was identified in step 727, the CI 155 logic is designed to perform different tasks and/or sub-tasks under the control of State Machine 260 in cooperation with other logic blocks 230–270 within CI 155. Details of the variety of steps performed by the CI 155 for each unique command identified by a given command code 510 are beyond the scope of the present discussion.

At step 743, the CI 155 sets the Command Complete bit in the Interrupt Source register 271, and generates an interrupt for the local processor 121 depending on the state of the command chaining bit 514 for the just completed command as previously disclosed in the text accompanying FIG. 5. The type of interrupt generated depends on whether the command completed successfully without an error or unsuccessfully with an error. In general at decision step 748, processing will continue at step 721 for a just executed command that completed successfully without an error. However, processing will continue for a just executed command that completed unsuccessfully with an error only after the CI 155 is expressly restarted by the local processor 121 by setting the Recovery bit in the Recovery register 274. Note that while the CI 155 is halted due to an error, the local processor 121 can remove a command from the Command Queue 276 as necessary in response to the error. The result of removing a command from the Command Queue 276 means that the associated SG Lists 601 in the SG RAM 240 and their associated pointers and/or counters in Tracking Counter 244 are cleared.

Alternatively, if it is determined at decision step 748 that no additional commands are in the Command Queue 276 for execution by the CI 155, then the Busy bit in the CI Status register 931 is turned off at step 750. Turning off the Busy bit means that there are no commands available to fetch and execute from the Command Queue 276. Processing then continues at step 758 by returning to step 322 of FIG. 3.

Types of errors that can occur during command execution and the error interrupts that the CI 155 can generate in response to each type of error can include, but are not limited to, the list set forth below.

Verify Error—If during execution of a Verify command a "□1" is detected in the data pattern being verified, the CI 155 sets a Verify Error bit in the Interrupt Source register 271 and the CI 155 halts. An address of the specific location of the error or an address in the vicinity of the error, is placed in the Error Address register 275. Similarly, a verify error can occur during execution of a Compare command. For example, if during the read of the last source data the result of the Compare command□s XOR operation contains a □1" in the previously accumulated data, then the CI 155 sets the Verify Error bit in the Interrupt Source register 271 and the CI 155 halts. An address of the specific location of the error or an address in the vicinity of the error, is placed in the Error Address register 275.

CI ECC Check Fail—If during execution of an ECC__ Check command multiple un-correctable ECC errors are detected in the data pattern being checked, or if during execution of any other command a data read causes multiple un-correctable ECC errors, the CI 155 sets the ECC Check Fail bit in the Interrupt Source register 271 and the CI 155 halts.

Programming Error—A programming error can occur in the context of any command being executed by the CI 155. For example, if during execution of a DMA read or write operation it is determined that the contents of the source count field 540 in Command Block 501 is not equal to 1, the CI 155 sets the Programming Error bit in the Interrupt Source register 271 and the CI 155 halts.

Illegal Command—If the command code field 510 of a given Command Block 501 contains a code that does not identify a known command, the CI 155 sets the Illegal Command bit in the Interrupt Source register 271 and the CI 155 halts.

Bad Address Error—If, for example, a device on either bus 140, 141, or 156 fails to respond to an addressed request from CI Interface 250, then the CI 155 sets the Bad Address bit in the Interrupt Source register 271 and the CI 155 halts. An address of the specific location of the error or an address in the vicinity of the error, is placed in the Error Address register 275.

FIG. 8 illustrates an example of the operational steps 800 for locating and loading source and/or destination SG Lists in the SG RAM 240 and the corresponding data into I/O controller memory 157 local to the CI 155. Note that to appreciate the operational aspects of the scatter gather memory system of the present invention, the operational steps 800 are disclosed in the context of the I/O request commands previously disclosed. However, the scatter gather memory system can be used with any type of command and is not limited in is scope of use to only the I/O request commands previously disclosed.

The operational steps 800 begin at step 808 and are the details of step 735 in FIG. 7. One purpose of operational steps 800 is to retrieve the actual SG Lists 601 pointed to by the Command Block 501 into a fast directly accessible memory local to the CI 155. Note that the SG Lists 601 originate in either a local memory or an external memory as indicated by the Memory Location bit in the Command Location register 272 as previously disclosed.

If it is determined at decision step 815 that the decoded command code 510 indicates that the command of the present Command Block 501 is either a Compare, ECC Check, or Verify command, then no destination SG List 601 exists and processing continues at step 835. Alternatively, if it is determined at decision step 815 that the decoded command code 510 indicates that the command of the present Command Block 501 is not a Compare, ECC Check, or Verify command, then a destination SG List 601 exists and processing continues at step 821. At step 821 the destination SG List address pointer 520 is retrieved from the immediate Command Block 501. At step 825, the SG List Element Counter 247 is loaded with the destination SG count 521 from the Command Block 501, and the SG List Counter 246 is loaded with a value of zero. The reason the SG List Counter 246 is loaded with a value of zero is because the Command Block 501 implementation disclosed in FIG. 5 contains only one destination SG address pointer 520 to a single destination SG List.

At step 828, as many SG list elements as exist in the destination SG List 601, are retrieved from the designated SG List location and loaded into the SG RAM 240 for subsequent use in placing destination data in the appropriate destination location during actual data manipulations. The SG List Element Counter 247 is decremented by one for each SG list element that is fetched and loaded into the SG RAM 240 during step 828. The actual destination data locations pointed to by respective elements of the destination SG List 601 can be either in external memory or in memory 157 that is local to the CI 155.

If it is determined at decision step 835 that the decoded command code 510 is an Initialize command, then no source SG List exists and processing continues at step 878. Alternatively, if it is determined at decision step 835 that the decoded command code 510 is not an Initialize command, then processing continues at step 842 to begin a loop to fetch the at least one source SG List 601 identified in the Command Block 230 into the SG RAM 240. The actual source data locations pointed to by respective elements of the source SG Lists 601 can be in external memory or in memory 157 local to the CI 155. At step 842, the total number of source SG Lists 530 is determined by reading the Source Count field 540 from the Command Block 501. The value in the Source Count field 540 is loaded into the SG List Counter 246 to keep track of the remaining number of SG Lists 530 to fetch during the SG List fetch loop. At step 850, the address of the next source SG List is retrieved from the Command Block 501.

At step 855, the SG List Element Counter 247 is loaded with an appropriate one of the source SG counts 541–542 from the Command Block 501 that corresponds to the SG List 530 identified by the SG List Counter 246. At step 858, as many SG list elements as exist in the present one of the source SG Lists 530 identified by SG List Counter 246, are retrieved from the designated source SG List origin location and loaded into the SG RAM 240 for subsequent user in retrieving source data from the appropriate source location during actual data manipulations. The SG List Element Counter 247 is decremented by one for each SG list element that is fetched and loaded into the SG RAM 240 during step 858. Further, the SG List Counter 246 is decremented at step 865 to indicate that another one of the SG Lists 530 has been fetched.

If it is determined at decision step 874 that the source SG List Counter 246 is not zero, then processing continues to loop at step 850 as previously disclosed. Alternatively, if it is determined at decision step 874 that the source SG List Counter 246 is equal to zero, then processing continues at step 878 by returning to step 735 of FIG. 7.

Note that the destination SG List and the source SG Lists are kept separate in the SG RAM 240. In one embodiment, the destination SG List is loaded in high address memory locations in SG RAM 240 and the source SG Lists are loaded seriatim from the low address memory locations in SG RAM 240. Typically, the SG RAM 240 is sized to accommodate no more and no less than the maximum number of SG List elements that can exist as between the maximum number of destination SG Lists and source SG Lists.

Command Execution—FIGS. 9–14

FIGS. 9–14 illustrate the operational aspects of pointer and counter manipulations in flow diagram form that are necessary to keep track of source and/or destination data pointed to by the source and/or destination SG Lists in the SG RAM 240. The SG RAM 240 manipulations are illustrated in the context of executing the commands that operate on the data. The SG RAM 240 manipulations are controlled with counters, also referred to as pointers, that can be implemented in a variety of manners depending on whether the values are incremented or decremented and whether the values begin or end with 0 or 1. Examples of the counters used to index or address the source and/or destination SG Lists and the respective elements within each SG List within SG RAM 240, include but are not limited to, the SG List Element Counter 246 and the SG List Counter 247. These and other of the counters and/or pointers used to implement the scatter gather memory system of the present invention as detailed in FIGS. 9–14, are referred to as x, y, z and/or i, j, k values for clarity of the detailed discussion accompanying the respective figures. Note also that the necessary counters used to keep track of SG RAM 240 contents and referenced data during command execution, are located in either the State Machine 260 and/or the Tracking Counter 244 with all necessary logic and connectivity among the various CI 155 components. Where ever possible, the loading and/or incrementing of the various counters is executed on a first clock cycle and any actual fetch operation occurs on a second clock cycle. All variations used to control the logic of a given command are considered within the scope of the present invention. Further, each of the commands executed by the CI 155 are based on a design such that there are multiple sets of reads of source data for each write to a destination address pointed to by the destination SG List. The approach of multiple reads for each write results in highly efficient execution of I/O operations. The present examples in FIGS. 9–14 are for example purposes only and are not intended as the only implementation of each command with respect to the SG RAM 240.

Figure 9:
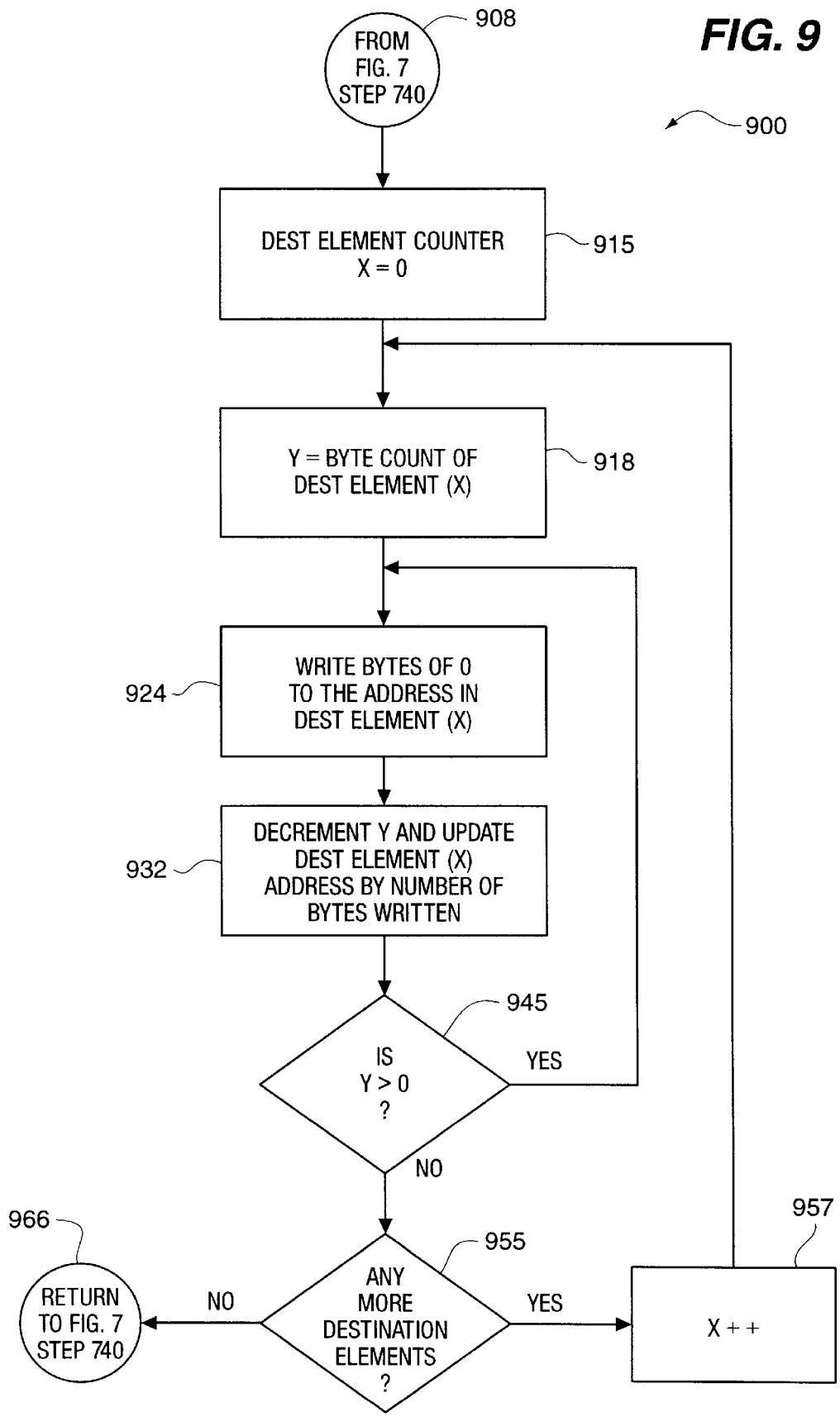
FIG. 9 illustrates the operational steps for executing an Initialize command.

FIG. 9 illustrates the operational steps 900 for executing an Initialize command. The operational steps 900 begin at step 908 and can represent the operational details of step 740 in FIG. 7. One purpose of the Initialize command is to clear or zero out an area of memory by writing zero☐s to a designated area of memory.

At step 915, a destination element counter x is initialized to 0 to represent the first destination element in the destination SG List 601. At step 918, a counter y is initialized to the byte count 612 of the number of bytes of data stored at the location pointed to by the address destination element (x). At step 924, bytes of the value 0 are written to the address in destination element (x) by way of the CI interface 250. The number of bytes that are written to the address in destination element (x) for a given write operation depends on the CI interface 250 and memory bus bandwidth serving the memory 157. The typical write operation may be a quad word per cycle.

At step 932, the byte counter y is decremented by the number of bytes written in step 924 and the address in the destination element (x) is updated to point to a new address that reflects the number of bytes previously written in step 924. If it is determined at decision step 945 that the byte counter y remains greater than zero, then there are additional bytes of the value 0 to write to the address in the destination element (x) and processing continues at step 924 as previously disclosed Alternatively if it is determined at decision step 945 that the byte counter y is less than or equal to zero, then processing continues at step 955.

If it is determined at decision step 955 that there are more destination elements to process in the destination SG List 601 in view of the total number of destination elements specified in the Destination Count 521, then the destination element counter x is incremented to represent the next destination element (x) and processing continues at step 918 as previously disclosed. Alternatively if it is determined at decision step 955 that there are no more destination elements in the present destination SG List, then processing continues at step 966 by returning to step 740 in FIG. 7.

Figure 10:
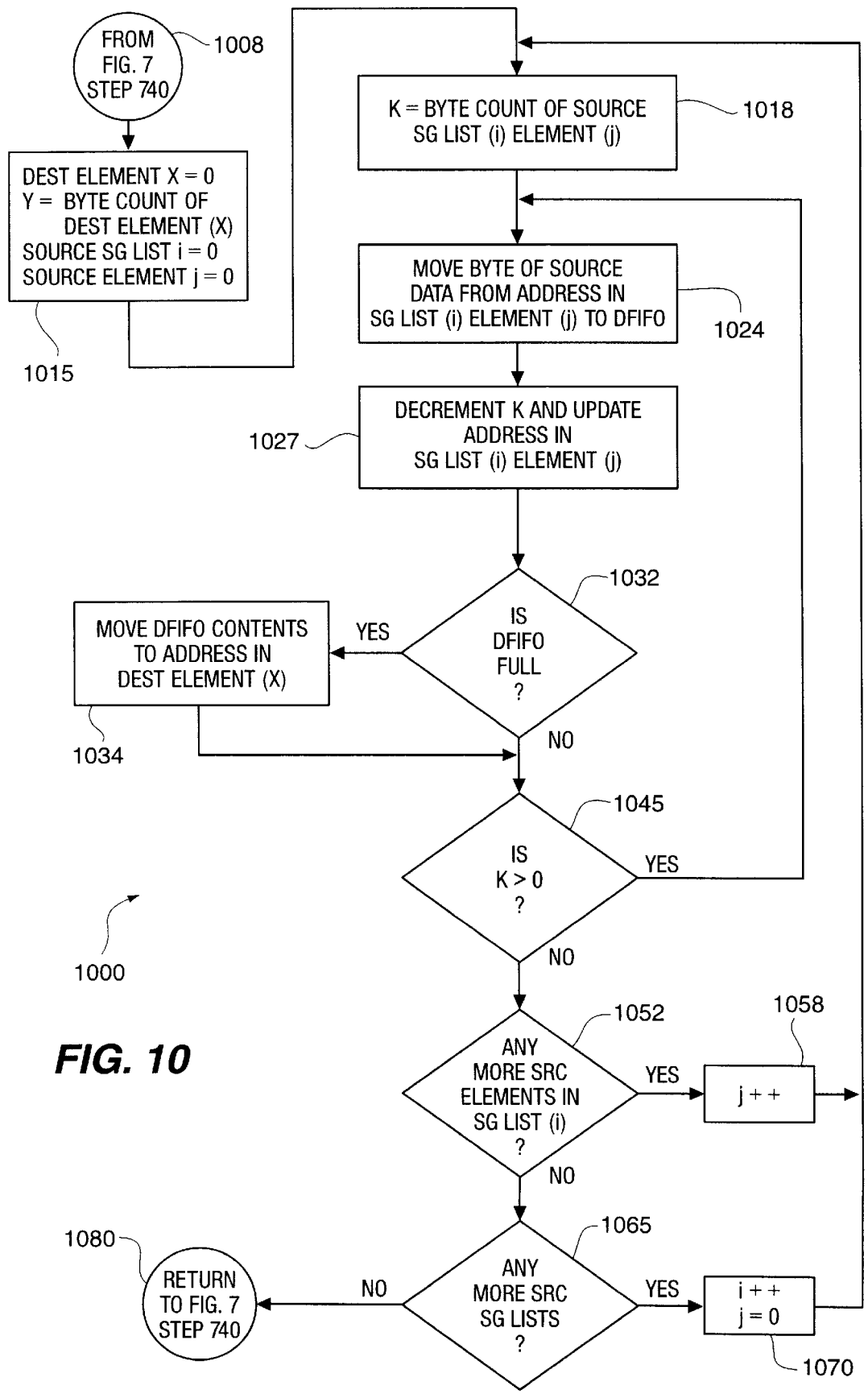
FIGS. 10–11 illustrate the operational steps for executing a Copy command, a DMA Read, and a DMA Write.
Figure 11:
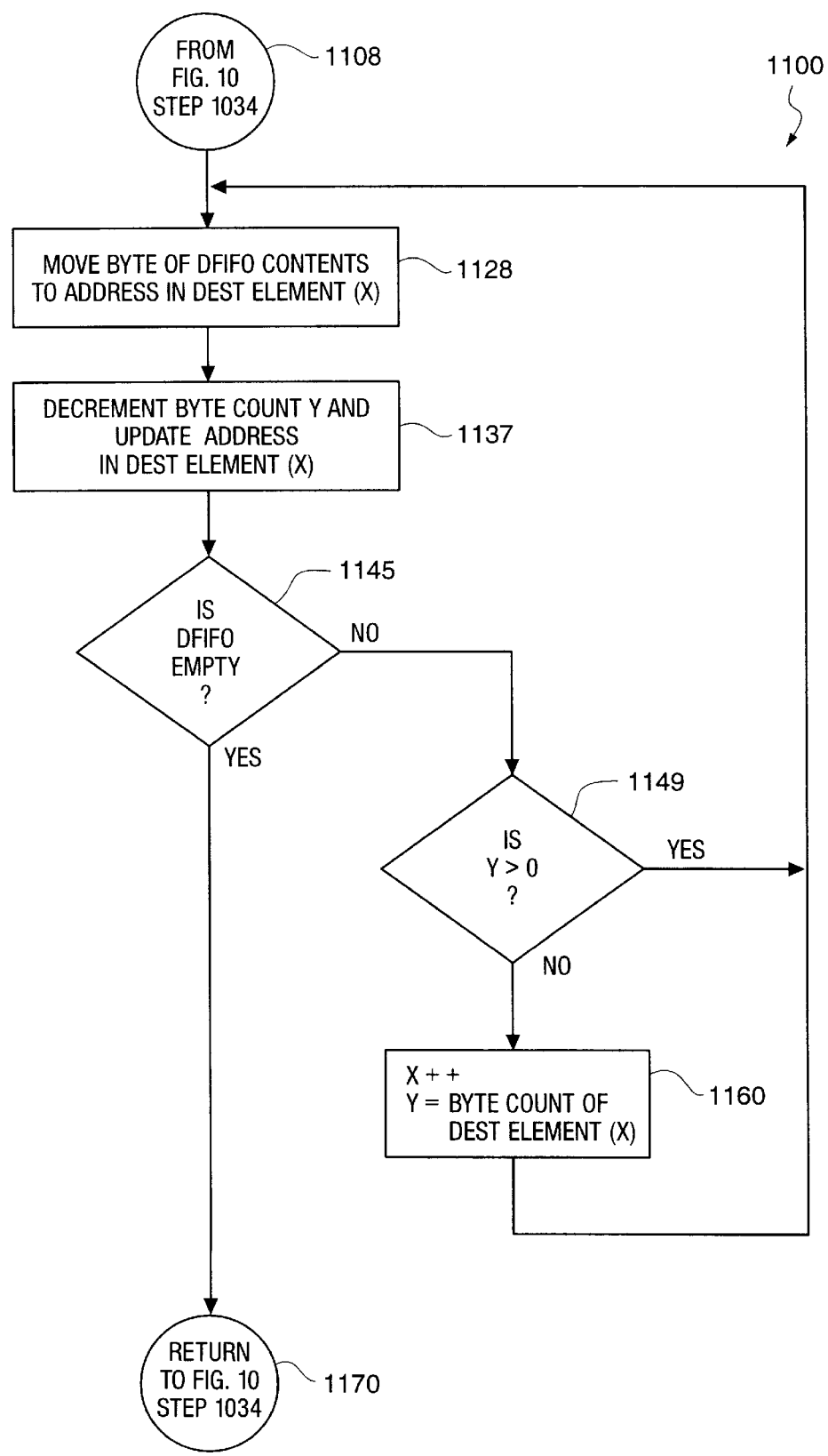

FIGS. 10–11 illustrate the operational steps for commands including, but not limited to, a Copy command, a DMA Read, and a DMA Write, wherein each command is designed to move data from a source location to a destination location. Specifically, FIG. 10 illustrates the steps for filling the DFIFO 268 with data from a source location and FIG. 11 illustrates the steps for emptying the DFIFO 268 to a destination location. One purpose of the Copy command is to move data from and to source and destination locations within local I/O controller memory 157. The intended purpose of the DMA Read command is to move data from a source location in non-I/O controller memory to a destination location in local I/O controller memory 157. Alternatively, one purpose of the DMA Write command is to move data from a source location in local I/O controller memory 157 to a destination location in non-I/O controller memory. Details of the Copy, DMA Read, and DMA Write operational steps are disclosed below.

FIG. 10 illustrates the operational steps 1000 for moving data from a source location to the DFIFO 268. The operational steps 1000 begin at step 1008 and can be the details of step 740 in FIG. 7. At step 1015, several counters and variables are initialized. The destination element counter x is initialized to 0 to represent the present destination SG List element on which the present command is operating. The counter y is initialized to the byte count 612 representing the number of bytes at the location pointed to by destination element (x). The counter i is initialized to 0 to represent the present source SG List on which the present command is operating. The counter j is initialized to 0 to represent the present source element in source SG List (i) being operated on by the present command. Finally, at step 1018, the counter k is initialized to the byte count 612 representing the number of bytes at the location pointed to by source SG List (i) element (j).

At step 1024, at least one byte of data is moved from the source address in the source SG List (i) element (j) to the DFIFO 268. At step 1027, the counter k representing the byte count of the source SG List (i) element (j) is decremented by the number of bytes moved in step 1024 and the address in the source SG List (i) element (j) is updated to reflect the number of bytes moved in step 1024.

If it is determined at decision step 1032 that the DFIFO 268 is full, then the contents of DFIFO 268 are moved to the location pointed to by the address in destination SG List element (x) at step 1034 and processing continues at step 1045. Details of moving the contents of DFIFO 268 to the location pointed to by the address in destination SG List element (x) is disclosed in FIG. 11. Alternatively, if it is determined at decision step 1032 that the DFIFO 258 is not full, then processing continues at step 1045.

If it is determined at decision step 1045 that the byte counter k is greater than zero, then processing continues to fill the DFIFO 268 at step 1024 as previously disclosed. Alternatively, if it is determined at decision step 1045 that the byte counter k is less than or equal to zero, then processing continues at step 1052. If it is determined at decision step 1052 that there are more source elements to process in the source SG List (i) in view of the total number of available source elements in Source SG Count (i) 541–542, then the source element counter j is incremented and processing continues to fill DFIFO 268 at step 1018 as previously disclosed. Alternatively if it is determined at decision step 1052 that there are no more source elements in the source SG List (i), then processing continues at step 1065.

If it is determined at decision step 1065 that there are more source SG Lists among the total number of source SG Lists in Source Count 540, then at step 1070 the source SG List counter (i) is incremented and the source SG List element counter (j) is reinitialized to point to the first element in the next source SG List. As a result, the SG List element counter (j) points to the first element of the next SG List. Processing then continues to fill the DFIFO 268 at step 1018 as previously disclosed. Alternatively, if it is determined at decision step 1065 that there are no more source SG Lists among the total number of source SG Lists in Source Count 540, then processing continues at step 1080 by returning to step 740 in FIG. 7.

FIG. 11 illustrates the operational steps 1100 for moving the contents of DFIFO 268 to a destination location pointed to by the address in destination element (x). The operational steps 1100 begin at step 1108 and can be the details of step 1034 in FIG. 10. More particularly, the operational steps 1100 that move data out of DFIFO 268 are substantially similar to the operation steps 1000 that move data into DFIFO 268.

At step 1128, at least one byte of the contents of the DFIFO 268 are moved to the memory location pointed to by the address in the destination SG List element (x). At step 1137, the byte counter y is decremented by the number of bytes moved in step 1128 and the address in the destination SG List element (x) is updated to reflect the number of bytes moved in step 1128. If it is determined at decision step 1145 that DFIFO 268 is not empty yet, then processing continues at step 1149. Alternatively, if it is determined at decision step 1145 that DFIFO 268 is empty, then processing continues at step 1170 by returning to step 1034 in FIG. 10.

If it is determined at decision step 1149 that the byte counter y is greater than zero, then processing continues to move the contents of DFIFO 268 to the destination memory location at step 1128 as previously disclosed. Alternatively, if it is determined at decision step 1149 that the byte counter y is less than or equal to zero, then at step 1160 the destination SG List element counter x is incremented to point to the next destination SG List element and the byte counter y is reinitialized to reflect the byte count of destination SG List element (x). Processing continues to move the contents of DFIFO 268 to the destination memory location at step 1128 as previously disclosed.

Figure 12:
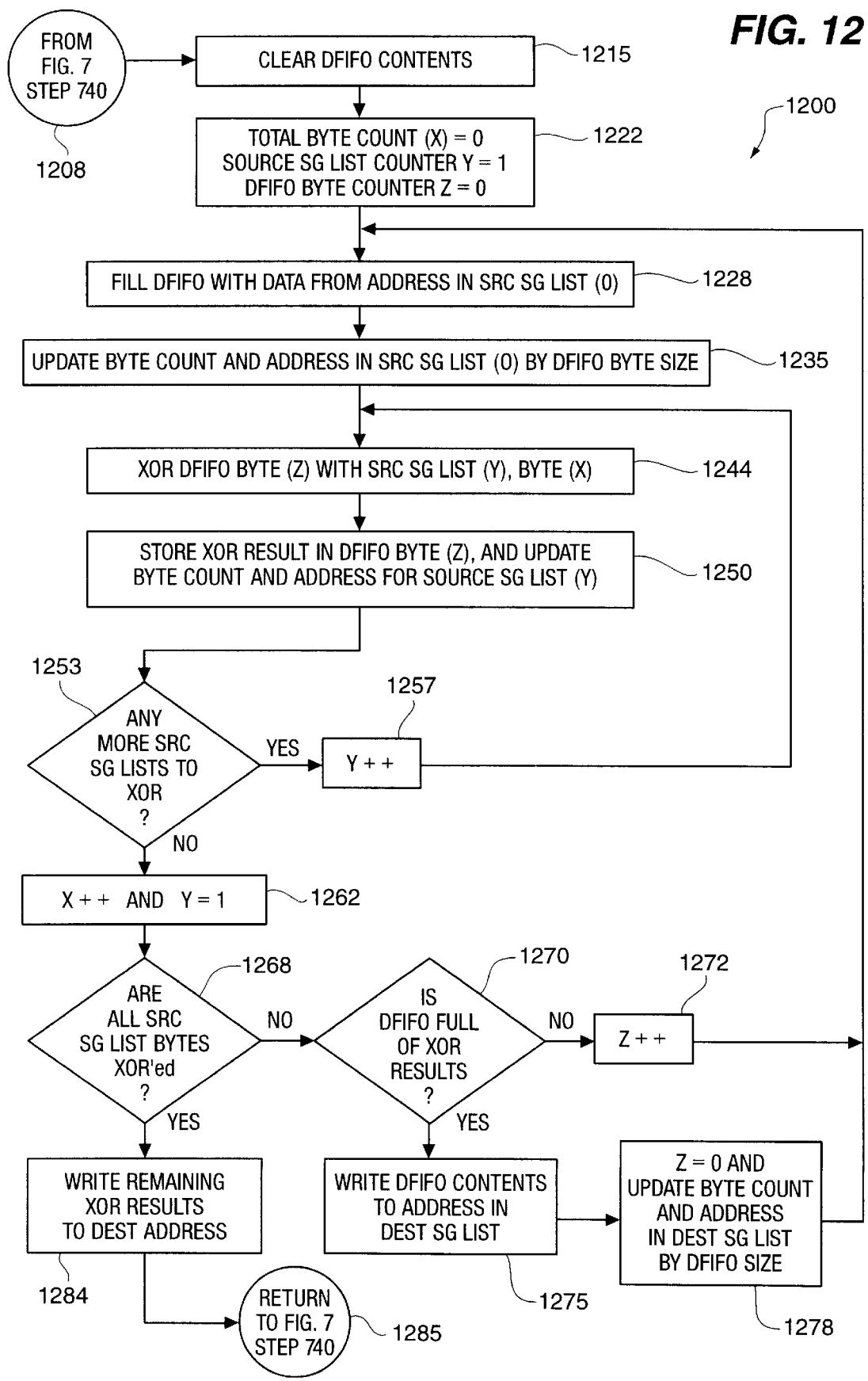
FIG. 12 illustrates the operational steps for executing an XOR command.

FIG. 12 illustrates the operational steps 1200 for the Exclusive-OR (XOR) command. One purpose of the XOR command is to perform an XOR operation on data pointed to by the source SG List and place the XOR operation result in the location pointed to by the destination SG List. More particularly, the preferred XOR command is a cumulative XOR command because the XOR results are accumulated across common byte positions of multiple blocks of source data and temporarily stored in DFIFO 268 until the DFIFO is full. Further, for each of the multiple sets of reads and XOR manipulations on the source data, there is one write of DFIFO 268 contents to a destination address pointed to by the destination SG List. This multiple read for each write results in highly efficient execution of I/O operations. Note that for purposes of the present example, all source SG Lists each have the same byte count. FIG. 12 begins at step 1208 and represents the details of step 740 in FIG. 7.

At step 1215, the DFIFO 268 is cleared. At step 1222, a counter x is initialized to represent the total number of bytes that have been operated on at any given time during the XOR command. In addition, a counter y is initialized to 1 to identify the second source SG List when counting the lists from 0-n, and a DFIFO byte counter z is initialized to 0 to identify the first byte position in a DFIFO 268.

At step 1228, DFIFO 268 is filled with data from the memory location pointed to by the address in source SG List (0), and at step 1235 the address in source SG List (0) is updated by the size of DFIFO 268 or the number of bytes just moved into DFIFO 268. At step 1244, byte (z) of DFIFO 268 is XOR☐ed with the byte (x) of source SG List (y) and at step 1250 the result of the XOR operation is stored in byte (z) of DFIFO 268. Also at step 1250, the byte count for source SG List (y) is updated to indicate that another byte has been processed, and the address in the source SG List (y) is updated to point to the next byte in list (y). Note that although the total byte count for each SG List is the same, it is understood that a byte count is maintained for each element of each SG List because the number of elements and the size of each block of data associated with each element can vary from one SG List to the next. Thus, there is a need to continually update the address in SG List (y) and its corresponding byte count for each time step 1250 is encountered.

If it is determined at decision step 1253 that there are more source SG Lists that have not yet had byte position (x) XOR☐ed, then the source SG List counter y is incremented at step 1257 and XOR processing continues at step 1244 as previously disclosed. The XOR operation itself is performed by loading byte (x) of a given source SG List into the Logic Unit 263 where the byte (x) is XOR☐ed with byte (z) of DFIFO 268. Alternatively, if it is determined at decision step 1253 that all source SG Lists have had byte position (x) XOR☐ed, then total byte counter x is incremented to point to a next byte in the respective source SG Lists, and source SG List counter y is incremented to point to the second source SG List in preparation for the next round of XOR operations.

If it is determined at decision step 1268 that all bytes of each source SG List has been XOR☐ed, then any remaining XOR results in DFIFO 268 are moved to the memory location pointed to by the address in destination SG List at step 1284 and processing is complete at step 1285 by returning to step 740 in FIG. 7. Alternatively, if it is determined at decision step 1268 that all bytes of each source SG List have not been XOR☐ed, then processing continues at step 1270.

If it is determined at decision step 1270 that DFIFO 268 is not full of XOR results, then the DFIFO counter z is incremented at step 1272 to point to the next byte in DFIFO 268 and XOR processing continues at step 1228 as previously disclosed. Alternatively, if it is determined at decision step 1270 that DFIFO 268 is full of XOR results, then at step 1275 the XOR results in DFIFO 268 are moved to the memory location pointed to by the appropriate address in the destination SG List. At step 1278, the DFIFO counter z is reinitialized to point to the first byte in DFIFO 268 and XOR processing continues at step 1228 as previously disclosed.

Figure 13:
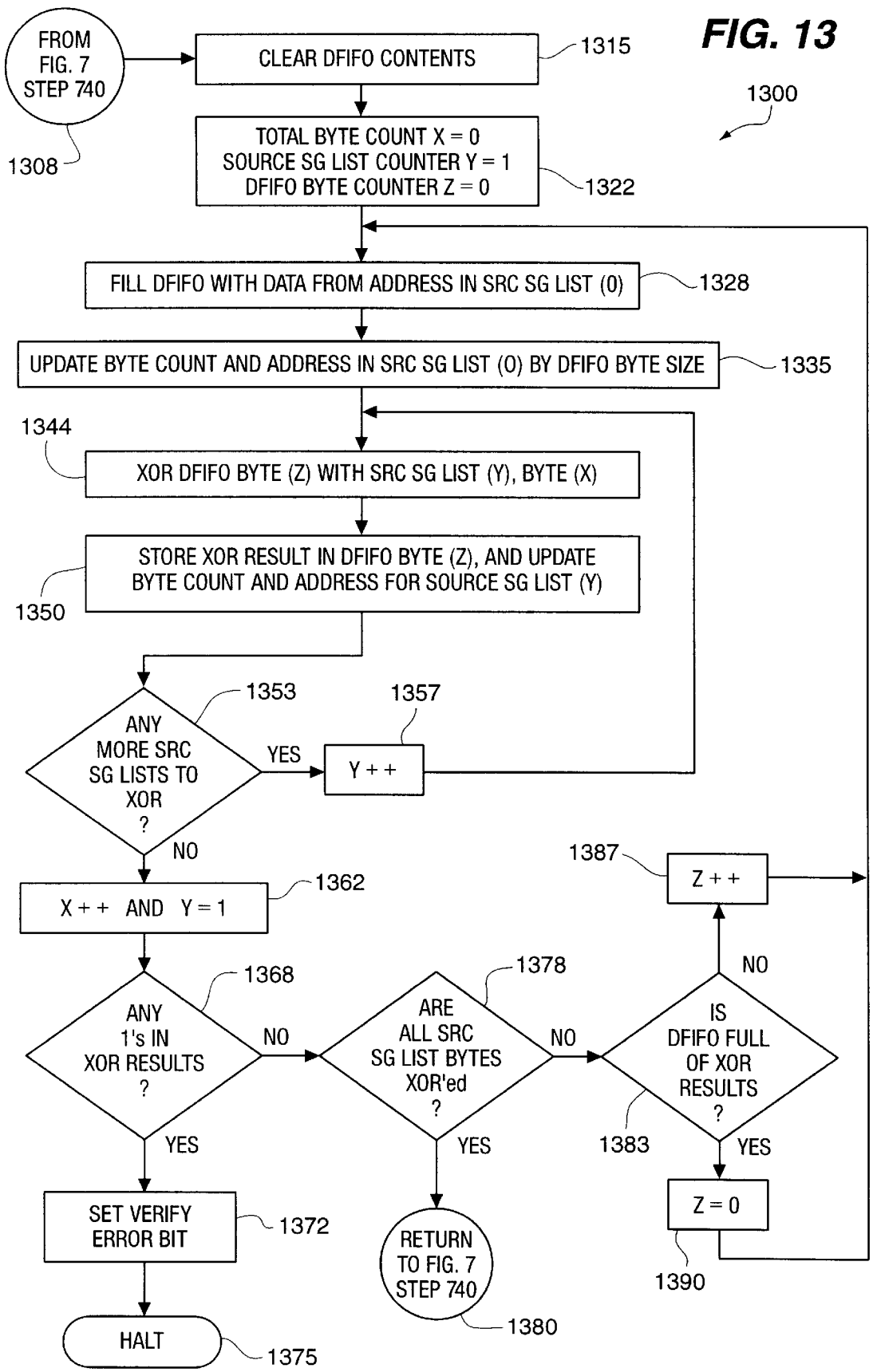
FIG. 13 illustrates the operational steps for executing a Compare command.

FIG. 13 illustrates the operational steps 1300 for performing a Compare command. One purpose of the Compare command is to perform a data and parity corruption check on user data and its corresponding parity data. The Compare command performs this check for corrupted user data and/or parity data by XOR☐ing user data against itself and against the corresponding parity data so that the final XOR result produces all zero values for each byte of uncorrupted data and a one value for each corrupted byte of data. For this reason, the Compare command is essentially the XOR command of FIG. 12 with the addition of a test for 1 values in the results of the XOR operation. More specifically, steps 1308 through 1362 of FIG. 13 are identical to the steps 1208 through 1262 of FIG. 12 inclusive. However for purposes of executing a Compare command, in addition to the n source SG Lists that point to user data, there exists one additional source SG List that points to the parity data that corresponds to the user data. Further, the result of the XOR operations of a Compare command are not saved at any destination location. The following discussion discloses details of operational steps 1300 that occur subsequent to step 1362 in FIG. 13 that are distinguishable from the operational steps 1200 of FIG. 12.

If it is determined at decision step 1368 that there are any 1 values in the XOR results from step 1344, then at step 1372 a Verify Error bit is set in the Interrupt Source register 271 and the CI 155 halts at step 1375. An address of the data location at or near the source of the Compare error is also stored in the Error Address register 275 by the CI 155. The CI 155 remains halted at step 1375 until the Recovery bit is set in the Recover register 274. Alternatively, if it is determined at decision step 1368 that there are no 1 values in the XOR results from step 1344, then processing continues at step 1378.

If it is determined at decision step 1378 that all bytes of each source SG List have been XOR☐ed, then processing is complete at step 1380 by returning to step 740 in FIG. 7. Alternatively, if it is determined at decision step 1378 that all bytes of each source SG List have not been XOR☐ed, then processing continues at step 1383.

If it is determined at decision step 1383 that DFIFO 268 is not full of XOR results, then the DFIFO counter z is incremented at step 1387 to point to the next byte in DFIFO 268 and Compare processing continues at step 1328 as previously disclosed. Alternatively, if it is determined at decision step 1383 that DFIFO 268 is full of XOR results, then at step 1390 the DFIFO counter z is reinitialized to point to the first byte in DFIFO 268 and Compare processing continues at step 1228 as previously disclosed. Note that it is considered within the scope of the present invention to execute the operational steps of the Compare command in a manner that evaluates the XOR results on a byte by byte basis in the Logic Unit 263 and evaluating the XOR results in DFIFO 268 as disclosed in steps 1350 and 1383 for example.

Figure 14:
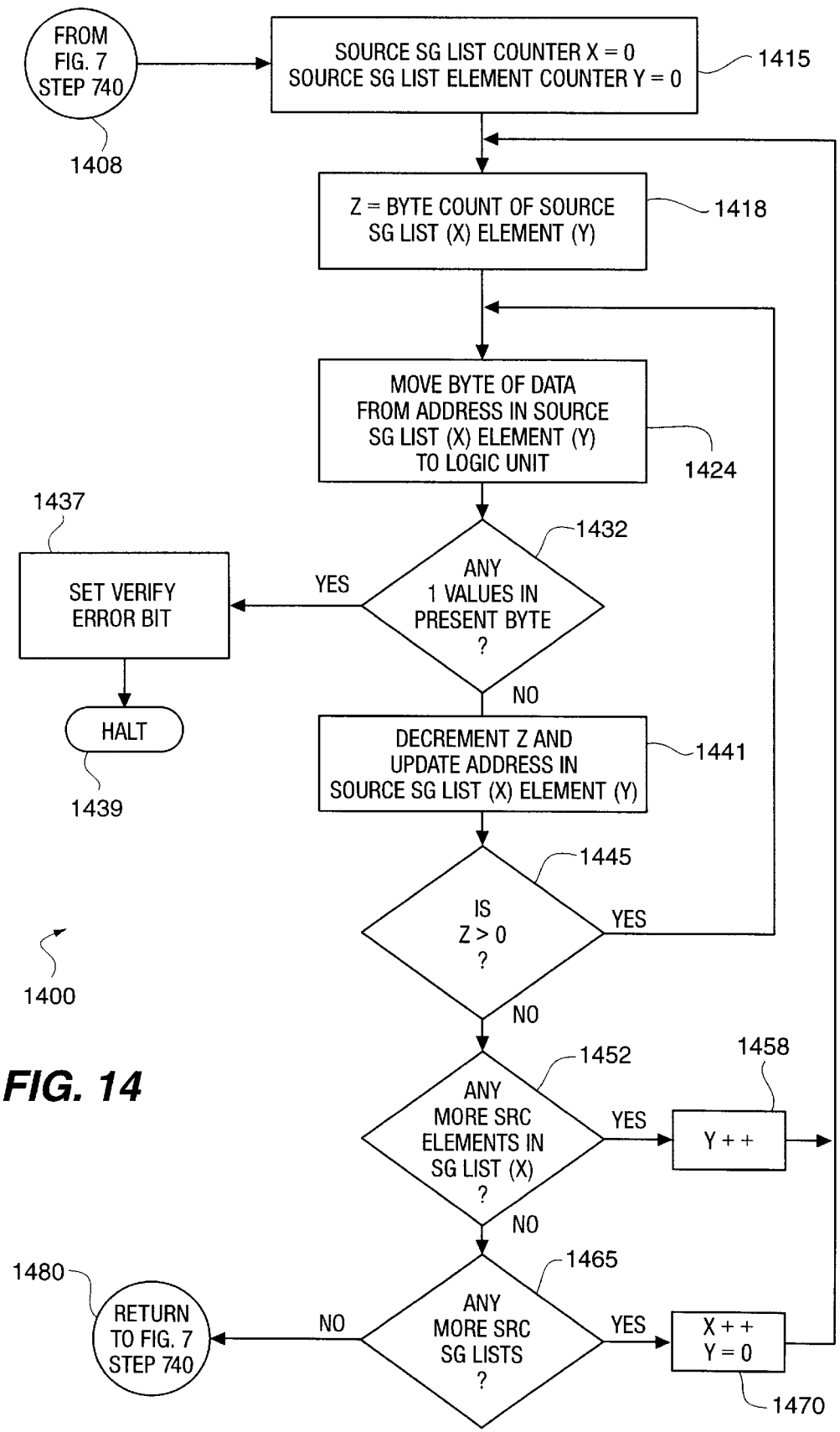
FIG. 14 illustrates the operational steps for executing a verify command and an ECC Check command.

FIG. 14 illustrates the operational steps 1400 for executing the Verify command. One purpose of the Verify command is to determine if the data pointed to by the source SG Lists contain any 1 values. If any 1 values exist, the presence of the 1 values is noted by setting a Verify Error bit in the Interrupt Source register 271. The Verify command functions in a manner such that the combination of the XOR command and the Verify command achieve the same end as would executing the Compare command alone as previously disclosed in the text accompanying FIG. 13. However, the existence of the set of commands that include an XOR, Verify, and Compare, afford significant I/O operation flexibility for the CI 155.

The operational steps 1400 begin at step 1408 and can be the details of step 740 in FIG. 7. At step 1415, the counter x is initialized to 0 to represent the present source SG List on which the present command is operating, and the counter y is initialized to 0 to represent the present source element in source SG List (x) being operated on by the present command. Further, at step 1418, the counter z is initialized to the byte count 612 representing the number of bytes at the location pointed to by source SG List (x) element (y).

At step 1424, at least one byte of data is moved from the address in the source SG List (x) element (y) to the Logic Unit 263. If it is determined at decision step 1432 that the byte or bytes in the Logic Unit 263 contain a 1 value, then at step 1437 the Verify Error bit is set in the Error Status register 273 and the CI 155 halts at step 1439. An address of the data location at or near the source of the location of the Verify error can also be stored in the Error Address register 275 by the CI 155. The CI 155 remains halted at step 1439 until the Recovery bit is set in the Recover register 274. Alternatively, if it is determined at decision step 1432 that there are no 1 values in the byte or bytes in the Logic Unit 263, then processing continues at step 1441. At step 1441, the counter z representing the byte count of the source SG List (x) element (y) is decremented by the number of bytes moved in step 1424 and the address in the source SG List (x) element (y) is updated to reflect the number of bytes moved in step 1424.

If it is determined at decision step 1445 that the byte counter z is greater than zero, then processing continues to evaluate source data at step 1424 as previously disclosed. Alternatively, if it is determined at decision step 1445 that the byte counter z is less than or equal to zero, then processing continues at step 1452. If it is determined at decision step 1452 that there are more source elements to process in the source SG List (x) in view of the total number of available source elements in Source SG Count (x) 541–542, then the source element counter y is incremented and processing continues to evaluate source data at step 1418 as previously disclosed. Alternatively if it is determined at decision step 1452 that there are no more source elements in the source SG List (x), then processing continues at step 1465.

If it is determined at decision step 1465 that there are more source SG Lists among the total number of source SG Lists in Source Count 540, then at step 1470 the source SG List counter (x) is incremented and the source element counter (y) is reinitialized to point to the first element in the next source SG List. Processing then continues to evaluate source data at step 1418 as previously disclosed. Alternatively, if it is determined at decision step 1465 that there are no more source SG Lists among the total number of source SG Lists in Source Count 540, then processing continues at step 1480 by returning to step 740 in FIG. 7.

The ECC Check command is substantially similar to the operational steps 1400 in all respects except for the specific details of steps 1432 and 1437 as a disclosed below. One purpose of the ECC Check command is to determine the existence of errors and/or correct any errors where possible. Specifically when executing the ECC Check command, the decision step 1432 determines whether or not an uncorrectable ECC error exists in the byte or bytes presently loaded in the Logic Unit 263. If an ECC error exists, then the ECC Error bit is set in the Error Status register 273 and the CI 155 halts at step 1439 in the same manner as previously disclosed in the text accompanying step 1439 in FIG. 14. Alternatively, if when executing the ECC Check command it is determined at decision step 1432 that the present byte or bytes do not contain ECC errors, then processing continues at step 1441 as previously disclosed in the text accompanying FIG. 14.

Summary

The present invention is a scatter gather memory system for a hardware accelerated command interpreter that fetches and executes low level commands on behalf of at least one higher level hardware and/or software host or host device system. The hardware accelerated I/O data processing engine includes a command queue, a logic unit, a multiple purpose interface, at least one memory, and a controlling state machine. Although specific embodiments are disclosed herein, it is expected that persons skilled in the art can and will design alternative command interpreter systems that are within the scope of the following claims either literally or through the Doctrine of Equivalents.

What is claimed is:

1. An improved performance scatter gather memory system for use in a command interpreter of an I/O controller for a local host processor, said system comprising:

a random access memory in said command interpreter;

a plurality of counter registers operatively connected to said random access memory;

means for maintaining at least one list that contains at least one data location and data quantity pair in said random access memory;

a plurality of processor commands; and means for updating an actual location and quantity of data pointed by successive ones of said at least one data location and data quantity pair, in operational support of each of said plurality of processor commands in a manner independent of said local host processor and absent any controlling software.

2. A system according to claim 1 wherein said means for maintaining includes:

means for gathering said at least one list from a memory external to said command interpreter into said random access memory in response to a decoded one of said plurality of processor commands.

3. A system according to claim 1 wherein said at least one list includes:

a scatter gather list each designating said location and quantity of data selected from at least one of a group consisting of: a list of source data locations and a list of destination data locations.

4. A system according to claim 1 wherein said means for updating includes:

means for moving data, where dictated by any one of said plurality of processor commands, from a source location external to said data processing engine to at least one memory that is local to said data processing engine, said at least one memory being a random access memory cache for operational use during an operational one of said plurality of processor commands.

5. A system according to claim 1 wherein said first means for maintaining includes:

means for determining a location of and at least one list selected from at least one of a group of locations consisting of: a local I/O controller memory and a non-local I/O controller memory; and means for retrieving said at least one list from one of said group of locations to said random access memory for use in data location and quantity maintenance during operation of one of said plurality of processor commands, said at least one list being comprised of at least one pointer to a data location and at least one corresponding byte count indicative of a number of bytes at said data location.

6. A method for operating a scatter gather memory system in a hardware implemented command interpreter of an I/O controller in a local host computer, said method comprising:

receiving a request for an I/O data operation, said request having at least one data location pointer selected from at least one of a group of location types comprised of: a source data location and a destination data location, and a byte count indicative of a number of bytes in a respective data location, and at least one element count indicative of a number of data locations pointed to by at least one scatter gather list; and gathering said at least one scatter gather list into a local scatter gather random access memory in response to said step of receiving and in a manner independent of said local host processor operations and absent direct software control.

7. A method according to claim 6 including:

retrieving data pointed to by successive ones of said at least one scatter gather list, wherein each of said at least one scatter gather list includes at least one element and each of said at least one element includes a data location and a total byte count of a number of bytes in said data location; and maintaining a plurality of data pointers during operation of said I/O data operation to identify a present data location and a remaining number of bytes at said present data location that correspond to a present one of said at least one element in a present one of said at least one scatter gather list.

8. A method for using a scatter gather memory system in a command interpreter of an I/O controller, said command interpreter having a command queue, a logic unit, at least one local memory, and a controlling state machine, said method comprising:

retrieving data pointed to by successive ones of at least one scatter gather list, wherein each of said at least one scatter gather list includes at least one element and each of said at least one element includes a data location and a total byte count of a number of bytes in said data location, all operable in a manner independent of said local host processor operation and absent direct software control; and maintaining a plurality of data pointers during operation of a command interpreter command to identify a present data location and a remaining number of bytes at said present data location that corresponds to a present one of said at least one element in a present one of said at least one scatter gather list, in a manner independent of said local host processor operation and absent direct software control.

9. A method according to claim 8 including:

constructing said least one scatter gather list in a memory external to said command interpreter wherein said at least one scatter gather list includes at least one scatter/gather list element containing a data location and a byte count indicative of an amount of data corresponding to said data location; and gathering said at least one scatter gather list into a local scatter gather random access memory in response to a directive from said controlling state machine.

10. A method according to claim 8 including:

operating components of said scatter gather memory system in concert with said command interpreter as a self-contained plurality of gated logic blocks and registers independent of said local host processor and absent any controlling software, wherein said components include a scatter gather random access memory and said plurality of data pointers.

11. A method according to claim 10 wherein said step of operating components includes:

defining a first section of said scatter gather random access memory to contain at least one source scatter gather list and a second section of said scatter gather random access memory to contain at least one destination scatter gather list; and implementing said plurality of data pointers to point to present ones of said at least one destination scatter gather list and said at least one source scatter gather list as called for by a present one of said command interpreter command.

12. A method according to claim 9 including:

clearing said scatter gather random access memory and said plurality of data pointers associated therewith in response to an occurrence of an unsuccessful command interpreter command execution.

* * * * *